(12) United States Patent
Ichinose et al.

(10) Patent No.: US 7,847,427 B2
(45) Date of Patent: Dec. 7, 2010

(54) WIND TURBINE GENERATOR SYSTEM

(75) Inventors: Masaya Ichinose, Tokyo (JP); Motoo Futami, Tokyo (JP); Hiromitsu Sakai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/553,832

(22) Filed: Sep. 3, 2009

(65) Prior Publication Data

US 2009/0322087 A1    Dec. 31, 2009

Related U.S. Application Data

(63) Continuation of application No. 12/042,257, filed on Mar. 4, 2008, now Pat. No. 7,692,323, which is a continuation of application No. 11/679,759, filed on Feb. 27, 2007, now Pat. No. 7,355,296, which is a continuation of application No. 11/475,416, filed on Jun. 27, 2006, now Pat. No. 7,205,676, which is a continuation of application No. 10/996,645, filed on Nov. 23, 2004, now Pat. No. 7,095,130.

(30) Foreign Application Priority Data

Jan. 8, 2004    (JP) .............................. 2004-002559

(51) Int. Cl.
*H02P 9/00* (2006.01)
*F03D 9/00* (2006.01)

(52) U.S. Cl. ............................. 290/44; 290/55; 322/24

(58) Field of Classification Search .................. 290/44, 290/55; 322/20, 24, 29, 37
See application file for complete search history.

(56) References Cited

U.S. PATENT DOCUMENTS

| 4,511,807 | A | 4/1985 | Somerville | 290/44 |
|---|---|---|---|---|
| 4,992,920 | A | 2/1991 | Davis | 363/36 |
| 4,994,684 | A | 2/1991 | Lauw et al. | 290/52 |
| 5,083,039 | A | 1/1992 | Richardson et al. | 290/44 |
| 5,187,427 | A | 2/1993 | Erdman | 323/207 |
| 5,652,485 | A | 7/1997 | Spiegel et al. | 318/147 |
| 5,729,118 | A | 3/1998 | Yanagisawa et al. | 322/29 |
| 5,798,631 | A | 8/1998 | Spee et al. | 322/25 |
| 5,798,632 | A | 8/1998 | Muljadi | 322/29 |
| 6,137,187 | A | 10/2000 | Mikhail et al. | 290/44 |
| 6,380,719 | B2 | 4/2002 | Underwood et al. | 322/36 |
| 6,512,966 | B2 | 1/2003 | Lof et al. | 700/291 |
| 6,566,764 | B2 | 5/2003 | Rebsdorf et al. | |
| 6,600,240 | B2 | 7/2003 | Mikhail et al. | 307/85 |
| 6,812,586 | B2 | 11/2004 | Wackanov et al. | 290/52 |
| 6,856,038 | B2 | 2/2005 | Rebsdorf et al. | 290/44 |

(Continued)

FOREIGN PATENT DOCUMENTS

JP    63220724 A    9/1988

(Continued)

*Primary Examiner*—Nicholas Ponomarenko
(74) *Attorney, Agent, or Firm*—Volpe and Koenig, P.C.

(57) ABSTRACT

To shorten a startup interval to reach a synchronizing condition, a phase difference and an amplitude difference between the grid voltage and the stator voltage of one phase of a winding are obtained. The difference in amplitude is decreased prior to or in parallel to synchronizing the stator voltage with the grid voltage. The calculated compensation phase compensation value is used as an initial value for synchronizing at the next synchronizing operation.

2 Claims, 5 Drawing Sheets

U.S. PATENT DOCUMENTS

| | | | |
|---|---|---|---|
| 6,856,039 B2 | 2/2005 | Mikhail et al. | 290/44 |
| 6,856,041 B2 | 2/2005 | Siebenthaler et al. | 290/44 |
| 6,924,565 B2 | 8/2005 | Wilkins et al. | 290/44 |
| 6,958,550 B2 | 10/2005 | Gilbreth et al. | 290/52 |
| 7,015,595 B2 | 3/2006 | Feddersen et al. | 290/44 |
| 7,042,110 B2 | 5/2006 | Mikhail et al. | 290/44 |
| 7,071,579 B2 | 7/2006 | Erdman et al. | 290/55 |
| 7,095,130 B2 * | 8/2006 | Ichinose et al. | 290/44 |
| 7,095,131 B2 | 8/2006 | Mikhail et al. | 290/44 |
| 7,180,270 B2 | 2/2007 | Rufer et al. | 322/20 |
| 7,205,676 B2 * | 4/2007 | Ichinose et al. | 290/44 |
| 7,215,099 B2 | 5/2007 | Yippo et al. | 322/29 |
| 7,332,894 B2 * | 2/2008 | Ichinose et al. | 322/29 |
| 7,355,296 B2 * | 4/2008 | Ichinose et al. | 290/44 |
| 7,453,242 B2 | 11/2008 | Ichinose et al. | 322/29 |
| 7,471,007 B2 | 12/2008 | Bucker et al. | 290/44 |
| 7,485,980 B2 | 2/2009 | Ichinose et al. | 290/44 |
| 7,659,637 B2 * | 2/2010 | Ichinose et al. | 290/55 |
| 2005/0151377 A1 * | 7/2005 | Ichinose et al. | 290/44 |
| 2006/0244265 A1 * | 11/2006 | Ichinose et al. | 290/44 |
| 2007/0024247 A1 * | 2/2007 | Ichinose et al. | 322/24 |
| 2007/0200348 A1 * | 8/2007 | Ichinose et al. | 290/44 |
| 2008/0185845 A1 * | 8/2008 | Ichinose et al. | 290/44 |
| 2009/0066297 A1 | 3/2009 | Ichinose et al. | 322/29 |

FOREIGN PATENT DOCUMENTS

| | | |
|---|---|---|
| JP | 04121100 A | 4/1992 |
| JP | 05168297 A | 7/1993 |
| JP | 08154399 A | 6/1996 |
| JP | 09065572 A | 3/1997 |
| JP | 2000-308398 | 11/2000 |
| JP | 2001309561 A | 11/2001 |
| JP | 2002252928 A | 9/2002 |
| JP | 2003164156 A | 6/2003 |

* cited by examiner

WIND TURBINE GENERATOR SYSTEM

CROSS-REFERENCE TO THE RELATED APPLICATIONS

This application is a continuation of application Ser. No. 12/042,257 filed on Mar. 4, 2008, which is a continuation of application Ser. No. 11/679,759 filed Feb. 27, 2007, now a U.S. Pat. No. 7,355,296, which is a continuation of application Ser. No. 11/475,416 filed Jun. 27, 2006, now a U.S. Pat. No. 7,205,676, which is a continuation of application Ser. No. 10/996,645 filed Nov. 23, 2004, now a U.S. Pat. No. 7,095,130, the entire contents of which are incorporated by reference. This application also claims benefit of priority under 35 U.S.C. §119 to Japanese Patent Application No. 2004-002559 filed Jan. 8, 2004, the entire contents of which are incorporated by reference.

FIELD OF THE INVENTION

This invention relates to a wind turbine generator system using a doubly fed generator which provides easiness in synchronizing with a grid voltage.

BACKGROUND OF THE INVENTION

Doubly fed generators can output at their stator an AC voltage having the same frequency as that in a grid voltage frequency by exciting a rotor winding with a slip frequency by a converter and provide relative freedom of the rotational frequency and reduction in capacity of a converter. Japanese laid-open patent application publication No. 2000-308398 discloses such a doubly fed generator. Further, due to the relative freedom of the rotational frequency in generation operation and the reduction in capacity of the converter, the doubly fed generator is used for wind turbine generators. U.S. Pat. No. 6,566,764 discloses such a wind turbine generator system.

In the conventional wind turbine generator system employing a doubly fed generator, a converter has a lower capacity than the generator frequently. Thus, when the rotation frequency reaches a predetermined range, the wind turbine generator system should frequently repeat starts and stops due to affection of variation in wind power because the generator should be operated in parallel to, synchronously with the grid. This elongates a time interval necessary for synchronous operation with the grid. Thus, there may be intervals in which power cannot be generated though wind is blowing. This decreases availability of the wind turbine generator system.

SUMMARY OF THE INVENTION

An aspect of the present invention provides a wind turbine generator system employing a doubly fed generator allowing the system to readily enter a synchronous operation with the grid.

A further aspect of the present invention provides a wind turbine generator system that controls amplitude and a phase of the output to shorten an interval necessary for the doubly fed generator to acquire synchronism with a grid voltage. Further, an initial value of a position sensor of the rotor may be automatically compensated.

A further aspect of the present invention provides a wind turbine generator system that calculates a phase difference between the grid voltage and one phase output from a stator to actively compensate the deviation to shorten the startup interval necessary for reaching the synchronous condition.

A further aspect of the present invention provides a wind turbine generator system in which the number of voltage sensors for the stator can be reduced.

A further aspect of the present invention provides a wind turbine generator system in which an integration value of compensated phase obtained upon success in synchronism is used as an initial value for the following synchronizing operations.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

First Embodiment

Figure 1:
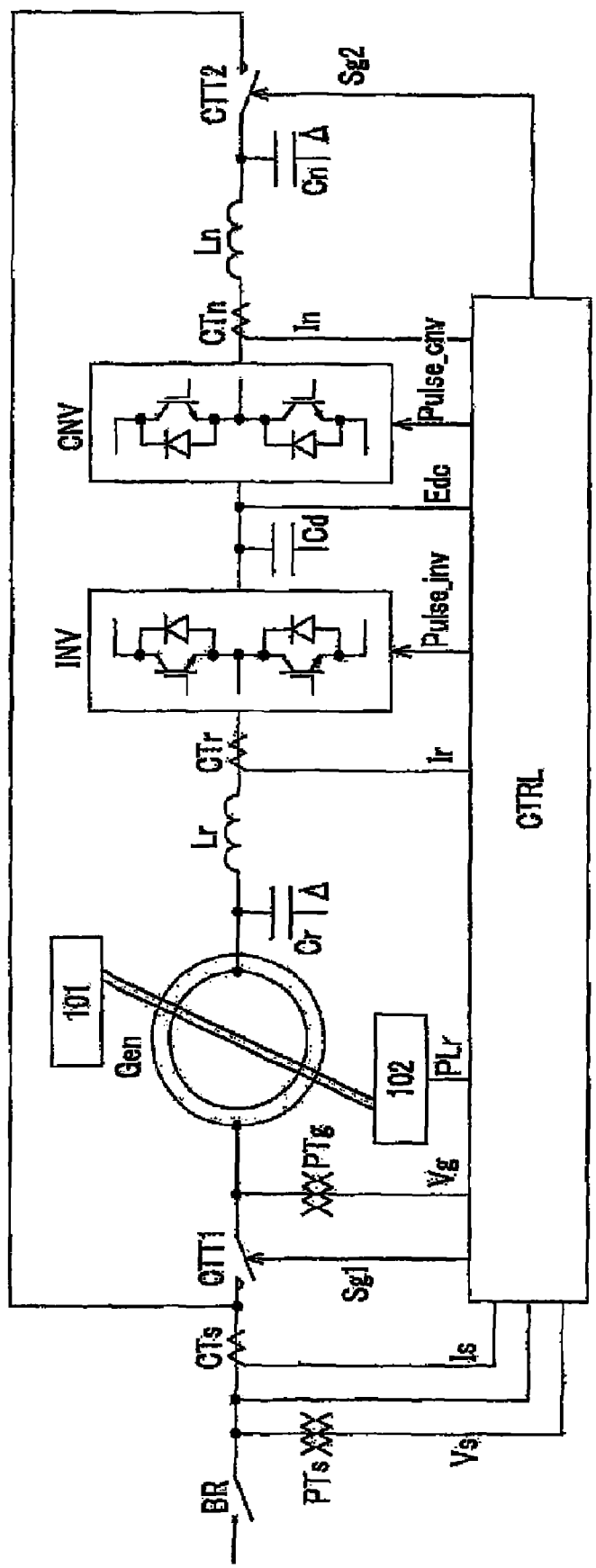
FIG. 1 is a skeleton diagram illustrating a circuit configuration of a wind turbine generator system according to the present invention.

Electric wirings and respective sections of a wind turbine generator system for generating an electric power will be described with reference to FIG. 1. A wind turbine generator Gen according to this embodiment is of a doubly fed type of which three phase outputs from a stator are connected to a secondary side of a magnet contactor CTT1 switchable in response to a switch control signal. A primary side of the magnet contactor CTT1 is connected to a primary side of a magnet contactor CTT2 and to a secondary side of a breaker BR of which primary side is connected to a grid (an AC line).

The breaker BR has such a function that, upon a flow of an excessive current, a circuit connected to the breaker BR is opened to cut off a current flowing therethrough and, upon closing the breaker BR, power is supplied to the control unit CTRL of the wind turbine generator system and the magnetic contactor CTT1.

The secondary side of the magnet contactor CTT2 is connected to an AC terminal of a converter CNV for cooperative operation through a capacitor Cn and a reactor Ln having a delta connection. On the other hand, a DC terminal of the converter CNV is connected to a DC terminal of a converter INV for excitation through a smoothing capacitor Cd for a DC current output.

The converter CNV for the cooperative operation and the converter INV for excitation having power semiconductor switching elements (for example, thyristors, GTO (gate turn-off thyristor), IGBT (Insulated Gate Bipolar Transistor), power MOSFET (metal oxide semiconductor field effect transistor), and bi-polar transistors) for converting an alternating current into a direct current and vice versa, respectively.

AC terminals of the converter INV for excitation are connected to the secondary winding terminals of the generator Gen through reactors Lr and capacitors Cr. A rotor of the generator Gen is coupled to a pinwheel (wind turbine, windmill) 101 for wind turbine power generation via a transmission gear unit and rotates in accordance with power of wind.

Wirings and units for controlling the generated power will be described. Three phase voltages and three phase currents of the primary side of the breaker BR are converted, by voltage sensors (transducers) PTs and current sensors (transducers) CTs, into low voltage signals Vs and Is supplied to the control unit CTRL. Three phase currents of the secondary side of the magnet contactor CTT1 (between the magnet contactor CTT2 and the converter CNV) are converted by current sensors (transducers) CTn into low voltage signals In indicative of values of the three phase currents, which are applied to the control unit CTRL. A rotation frequency and a position of the generator Gen are detected by an encoder 102 to output a phase signal PLr (pulse train) supplied to the control unit CTRL. A voltage of the capacitor Cd connected to the DC terminals of the converters CNV and INV is converted by a voltage sensor into a low voltage signal Vd supplied to the control unit CTRL.

The control unit CTRL will be described with reference to FIGS. 2 and 3.

The control unit CTRL controls the magnet contactors CTT1 and CTT2, and the converters INV and CNV by outputting signals Sg1, Sg2, Pulse_inv, and Pulse_cnv. The converter CNV for the cooperative operation is subjected to DC voltage control for keeping a DC voltage Edc at the smoothing capacitor Cd constant and to a system zero reactive power (power factor is one) from the control unit CTRL around when the wind turbine generator system is running and the generator Gen is coupled to the grid with the magnet contactor CTT1.

Figure 5:
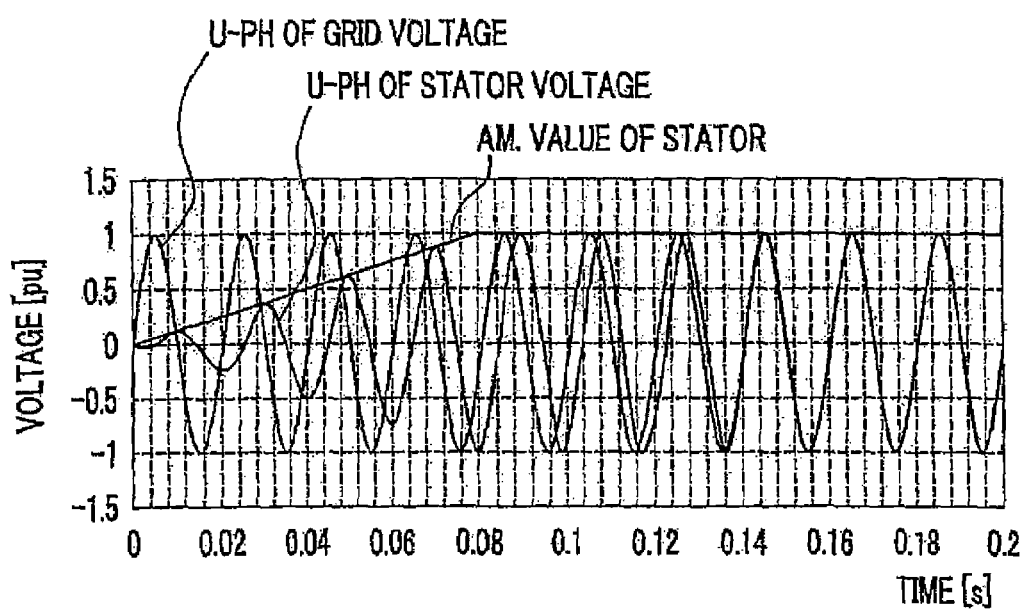
FIG. 5 is a graphical drawing illustrating a startup operation regarding voltage and phase matching, in accordance with the first embodiment.

More specifically, the breaker BR is closed, which turns on the control unit CTRL for operation. After that, the control unit CTRL closes the magnet contactor CTT2, so that the control unit CTRL and the converter CNV keep the DC voltage Edc constant. When a start command is applied to the control unit CTRL, the control unit CTRL and the converter INV executes a startup operation as shown in FIG. 5. When the stator voltage agrees with the grid voltage in amplitude and phase, a CTT1 contact command and a switching signal SG0 are outputted to make the CTT1 close and switch a switch SW (mentioned later). The magnet contactor CTT2 is kept close during the startup and the generation operation.

Thus, when the DC output voltage at the capacitor Cd drops due to use of the DC power by the converter INV for exciting, the converter CNV for cooperative operation charges the smoothing capacitor Cd using the AC power to maintain the DC voltage Edc constant. On the other hand, when the DC output voltage at the capacitor Cd increases due to charging the capacitor Cd by the converter INV for exciting, the converter CNV for cooperative operation converts the DC power into the AC power to discharge the smoothing capacitor Cd to maintain the DC voltage Edc constant.

The converter CNV for the cooperative operation will be described with reference to FIG. 3. The AC voltage detection value Vs is supplied to a three-to-two-phase converter 32$trs$. An output of the three-to-two-phase converter 32$trs$ is supplied to a phase detector THDET, a circuit dqtrs, and a synchronizing controller SYNC. The phase detector THDET calculates a phase signal THs tracking the grid voltage by, for example, a phase Locked Loop system (PLL) and supplies the phase signal THs to a three-to two-phase coordinate converter 32$dqtrs$ and the two-to-three-phase coordinate converter dq23$trs$. The DC voltage command value Eref and the DC voltage detection value Edc are supplied to a DC voltage regulator DCAVR comprising a proportional integrator. The DC voltage regulator DCAVR controls a d-axis current command value (effective component current command value) Idnstr in its output so as to make zero the deviation of the detected value from the inputted command value, the output being supplied to a current controller 1-ACR.

The three-to-two-phase coordinate converter 32$dqtrs$ calculates a d-axis current detection value Idn (active current), a q-axis current detection value Iqn (reactive current) from the inputted current In using Equation (1) to supply the d-axis current detection value Idn to the current controller 1-ACR and the q-axis current detection value Iqn to a current controller 2-ACR.

$$\begin{bmatrix} Idn \\ Iqn \end{bmatrix} = \begin{bmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{bmatrix} \quad (1)$$

$$\begin{bmatrix} \cos(THs) & \sin(THs) \\ -\sin(THs) & \cos(THs) \end{bmatrix}$$

The current controller 1-ACR controls the d-axis voltage command value Vdn0 at its output so as to make zero a deviation of the d-axis current detection value Idn from the d-axis current command value Idnstr to supply the d-axis voltage command value Vdn0 to an adder 301. Similarly, the current controller 2-ACR controls the q-axis voltage command value Vqn0 at its output so as to make zero a deviation of the q-axis current detection value Iqn from the q-axis current command value (0) to supply the q-axis voltage command value Vqn0 to the adder 301. The current controllers 1-ACR and 2-ACR may comprise, for example, a proportional integrator.

The three-to-two phase converter 32$trs$ calculates, using Equation (2), from the inputted voltage Vs, a d-axis voltage detection value (a phase component agreeing with the grid voltage vector) Vds and a q-axis voltage detection value (a quadrature (orthogonal) component of the d-axis voltage detection value Vds) Vqs to supply them to the adders 301 and 302.

The adder 301 adds the d-axis voltage command value Vdn0 to the d-axis voltage detection value Vds to supply the result to the two-to-three phase coordinate converter dq23$trs$. Similarly, the adder 302 adds the q-axis voltage command value Vqn0 to the q-axis voltage detection value Vqs to supply the result to the two-to-three phase coordinate converter dq23$trs$.

The two-to-three phase coordinate converter dq23$trs$ receives the phase signal THs and the results Vdn and Vqn of the adders 301 and 302 and calculates the voltage command values Vun, Vvn, and Vwn with Equations (2) and (3) to supply them to a PWM (pulse width modulation) operator PWMn.

$$\begin{bmatrix} Va \\ Vb \end{bmatrix} = \begin{bmatrix} \cos(THs) & -\sin(THs) \\ \sin(THs) & \cos(THs) \end{bmatrix} \begin{bmatrix} Vdn \\ Vqn \end{bmatrix} \quad (2)$$

$$\begin{bmatrix} Vun \\ Vvn \\ Vwn \end{bmatrix} = \begin{bmatrix} \cos(0) & \sin(0) \\ \cos(2\pi/3) & \sin(2\pi/3) \\ \cos(4\pi/3) & \sin(4\pi/3) \end{bmatrix} \begin{bmatrix} Va \\ Vb \end{bmatrix} \quad (3)$$

The PWM operator PWNn calculates from the inputted voltage commands Vun, Vvn, and Vwn, a gate signal Pulse_cnv for in a PWM method, turning on and off the n power semiconductor switching elements forming the converter CNV for the cooperative operation.

Control of the converter INV for excitation to generate gate signals will be described. The phase signal PLr indicative of the rotation frequency and the position of the rotor is applied to a rotation phase detector ROTDET. The rotation phase detector ROTDET converts the pulse PLr into a phase signal through counting the pulse PLr and resets the phase signal with an index pulse (z phase pulse in a ABZ system encoder) generated once per rotation to supply the phase signal RTH ranging 0° to 360° without overflow to an adder 303.

The adder 303 adds the phase signal RTH to an output phase signal LTH of the synchronizing controller SYNC to supply a phase signal TH to an excitation phase operator SLDET together with the phase signal THs. The excitation phase operator SLDET adds the phase signal TH to the phase signal THs and multiplies the result by the number of pairs of poles of the generator to output a phase signal THr indicative of an electrical angle frequency of the rotor of the generator Gen.

A power operator PQCAL receives the d-axis current Ids detected by converting the system current Is with the Equation (1), having the same direction as the U-phase vector of the grid voltage, the q-axis current Iqs which is a quadrature (orthogonal) component of the U-phase vector of the grid voltage, the d-axis voltage detection value Vds, and the q-axis voltage detection value Vqs, to calculate an effective electric power Ps and a reactive electric power Qs of the system in accordance with Equations (4) and (5).

$$Ps = 3(Vds \times Ids + Vqs \times Iqs) \quad (4)$$

$$Qs = 3(-Vds \times Iqs + Vqs \times Iqs) \quad (5)$$

An effective electric power controller APR receives the effective electric power Ps and an output power command Pref of the wind turbine generator system to generate a torque current command value Iq0 so as to make zero a deviation of the electric power detection value Ps from the electric power command value Pref. A reactive electric power controller AQR receives the reactive power Qs and an output power command Qref to generate an excitation current command value Id0 so as to make zero a deviation of the electric detection value Qs from the electric power command value Qref. The effective electric power controller APR and the reactive electric power controller AVR comprise, for example, a proportional integrator. Current command values Iq0 and Id0 of the outputs of the effective power controller APR and the reactive power controller AQR are supplied to the switch SW.

The switch SW determines whether the outputs of the effective electric power controller APR and reactive electric power controller AQR or a value of zero and an output of the voltage controller AVR are used as a torque current command value and an excitation current command value.

The switch SW outputs the latter (the value of zero for the torque current command value and the output of the voltage controller AVR for the excitation current command value) before the magnet contactor CTT1 is made close, i.e., in a synchronizing operation for synchronizing the stator output voltage with the grid voltage. After contact of the electromagnet contactor CTT1, the switch SW outputs the former (the output of the effective power controller APR and the reactive power controller AQR).

The voltage controller AVR is supplied with the amplitude value Vgpk of the stator voltage Vg as a feedback value and a value Vsref obtained by filtering an amplitude value of the grid voltage Vs as a command value to produce an output of the excitation current command value Id1 so as to make zero a deviation of the amplitude value of the stator voltage Vg from the command value Vsref to supply the output to the switch SW. The voltage controller AVR may comprise, for example, a proportional integrator controller. The voltage controller AVR operates in the open condition of the magnet contact CTT1 to calculate the command value of the excitation current flowing through the secondary windings of the generator Gen from the converter INV for excitation in order to equalize the amplitude values of the stator voltages of the generator Gen to the amplitude values of the grid voltages.

The three-to-two phase coordinate converter 32dqtrs calculates a d-axis current detection value Idr (excitation current component) and a q-axis current detection value Iqr (torque current component) with Equation (6) from the inputted current Ir and the phase THr of the rotor to supply the d-axis current detection value Idr to a current controller 4-ACR and the q-axis current detection value Iqr to a current controller 3-ACR.

$$\begin{bmatrix} Idr \\ Iqr \end{bmatrix} = \begin{bmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{bmatrix} \quad (6)$$

$$\begin{bmatrix} \cos(THs) & \sin(THs) \\ -\sin(THs) & \cos(THs) \end{bmatrix}$$

The current controller 4-ACR controls its output of the d-axis voltage command value Vdr so as to make zero a deviation of the d-axis current detection value Idr from the d-axis current command value Id1 or Id0. Similarly, the current controller 3-ACR controls its output of the q-axis voltage command value Vqr so as to make zero a deviation of the q-axis current detection value Iqr from the q-axis current command value Iq1 or Iq0. The current controllers may comprise, for example, a proportional integrator.

The d-axis voltage command value Vdr and the q-axis voltage detection value Vqr are applied to a two-to-three-phase coordinate converter dq23trs, which calculates a voltage command values Vur, Vvr, and Vwr as its outputs from the phase signal THr and the inputted values with Equations (7) and (8) to output them to a PWM operator PWMr.

$$\begin{bmatrix} Va \\ Vb \end{bmatrix} = \begin{bmatrix} \cos(THr) & -\sin(THr) \\ \sin(THr) & \cos(THrs) \end{bmatrix} \begin{bmatrix} Vdr \\ Vqr \end{bmatrix} \quad (7)$$

$$\begin{bmatrix} Vur \\ Vvr \\ Vwr \end{bmatrix} = \begin{bmatrix} \cos(0) & \sin(0) \\ \cos(2\pi/3) & \sin(2\pi/3) \\ \cos(4\pi) & \sin(4\pi/3) \end{bmatrix} \begin{bmatrix} Va \\ Vb \end{bmatrix} \quad (8)$$

The PWM operator PWMr generates, from the inputted voltage commands Vur, Vvr, and Vwr, gate signals Pulse_inv for, in a pulse width modulation (PWM) method, turning on and off the m semiconductor power switching elements constructing the converter INV for excitation to supply them to the converter INV.

The synchronizing controller SYNC will be described with reference to FIG. 2.

Figure 2:
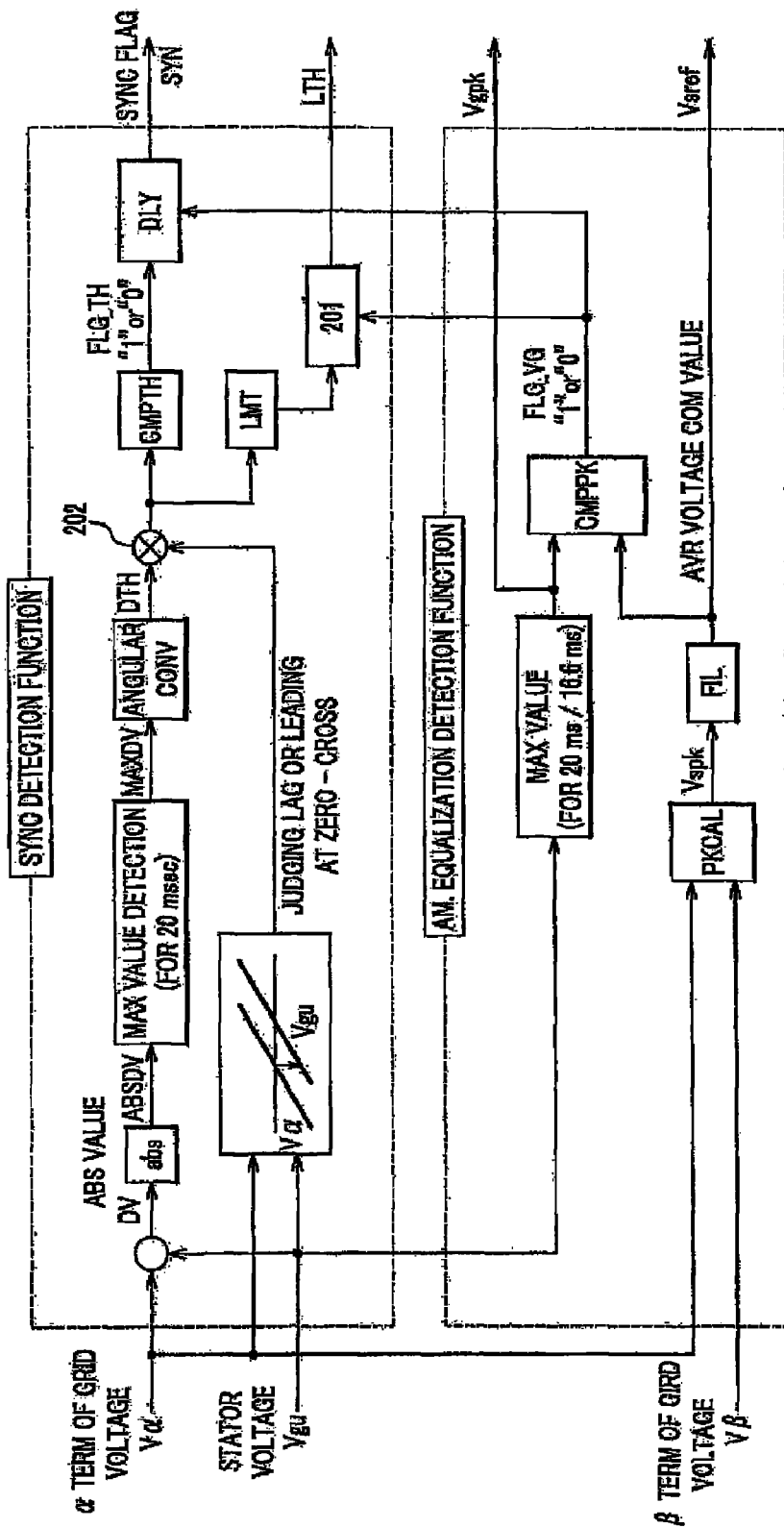
FIG. 2 is a block diagram illustrating a synchronizing control unit according to a first embodiment of the present invention.

The synchronizing controller SYNC receives Vα and Vβ obtained by three-to-two-phase-converting the grid voltage Vs and one phase of stator voltage of the generator Gen (U-phase voltage Vgu in FIG. 2).

The synchronizing controller SYNC mainly includes two functions, namely, a first function for operating the voltage command value to equalizing the amplitude value of the stator voltage to that of the grid voltage and a second function for operating a phase compensation value LTH for synchronizing the phase of the stator voltage with the phase of the grid voltage. The synchronizing controller SYNC shown in FIG. 2, first, equalizes the voltage amplitude value and second, controls the voltage phase for synchronization.

First, to equalize the amplitude of voltage, the synchronizing controller SYNC calculates the amplitude value Vspk of the grid voltage from a square root of a sum of squares of the Vα and Vβ and filters the calculated amplitude value with first-order delay filter FIL to remove ripple components to use it as a voltage command value Vsref for the voltage controller AVR. In this embodiment, only one of stator voltages is detected, and thus, to obtain the amplitude value of the Vgu, for example, a maximum amplitude value for one cycle of the grid voltage frequency (50/60 Hz) is detected as the amplitude value which is used as a feedback value Vgpk in the voltage controller AVR and for an amplitude agreement judgment unit CMPPK.

The amplitude synchronization judgment unit CMPPK compares the voltage amplitude Vgpk with the voltage command value Vsref. If the difference is within a predetermined range, an amplitude agreement flag FLG_VG is set "1" In other conditions, the amplitude agreement judgment CMPPK outputs "0". The phase synchronizing function operates when the amplitude agreement flag FLG_VG is "1" namely, when the amplitude of the stator voltage substantially agrees with the grid voltage. The term a of the grid voltage Vα corresponds to the U phase of the grid voltage. Thus, to synchronize the U phase of the stator voltage Vgu with the phase of the Vα, the difference between the phase of the Vα and the U phase of the stator voltage Vgu is used.

Here, it is assumed that the grid voltage agrees with the stator voltage in amplitude. Further, if it is assumed that an angular frequency of the grid voltage is ω0, an angular frequency of the stator voltage is ω1, a phase difference is dTH, and time is t, an absolute value ABSDV of the difference is calculated by an absolute value operator abs using Equation (9).

$$ABSDV = V\alpha - Vgu \quad (9)$$
$$= Vgpk \times \sin(\omega 0 \cdot t) - Vgpk \times \sin(\omega 1 \cdot t + dTH)$$

Here, the excitation phase THr is obtained by subtracting the rotation phase TH from the grid voltage phase THs, which is so-called a slip frequency. Thus, excitation with the phase signal THr by the converter INV equalizes the angular frequency ω1 to the angular frequency ω0, so that the frequency of the stator voltage automatically agrees with the grid voltage in frequency by the operation of exciting (ω1=ω1). Accordingly, if the amplitudes of voltage are equalized in advance, there is only a difference in phase.

Here, the Equation (9) can be simplified if the voltage amplitudes agree with each other.

$$ABSDV = Vgpk \times \sin(dTH) \text{ (after equalization in voltage amplitude)} \quad (10)$$

An angular converter detects a maximum value in Equation (10) for one cycle of the grid voltage and is divided by Vgpk for normalization. Thus, a phase difference operation value DTH is calculated by Equation (11) to output it.

$$DTH = ABSDV / Vgpk \quad (11)$$
$$= \sin(dTH)\text{(after equalization in voltage amplitude)}$$

Further, the Equation (11) can be approximated with an Equation (12).

$$DTH \approx dTH \quad (12)$$

Figure 4:
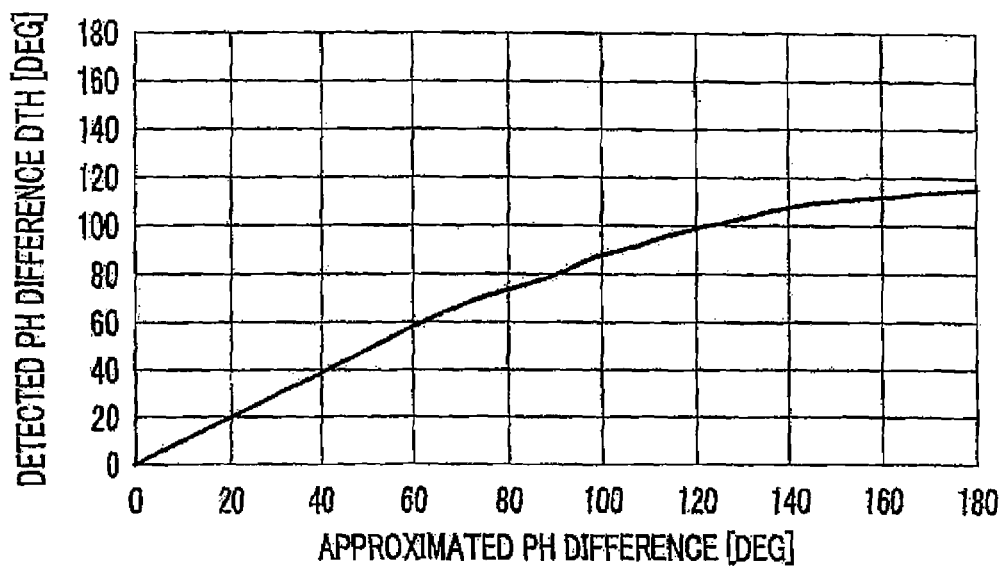
FIG. 4 is a graphical drawing showing a relation between a detected phase difference provided by Equation (11) and its approximated values provided by Equation (12) according to the first embodiment.

FIG. 4 represents the detected phase difference DTH obtained by the Equation (11) in the axis of ordinate and the values obtained in accordance with the Equation (12) in the axis of abscissa through plotting. As shown in FIG. 4, when the phase difference is small, for example, when the phase difference in the axis of the abscissa is lower than 45°, the values obtained by the Equation (11) substantially agree with those obtained by the Equation (12). On the other hand, as the phase difference becomes large, the difference between those obtained by the Equations (11) and (12) becomes large. However, no error occurs in a sign (polarity) of the phase difference.

Here, the phase difference DTH has a small error when the voltage amplitudes agree with each other, but has an error when the voltage amplitudes disagree. Thus, in order to provide a surer synchronism in phase even though an error in the voltage amplitude exists, a sign (polarity) of the stator voltage Vgu is judged at a zero-cross point of the α term Vα and supplied to the multiplier 202 which multiplies the phase difference DTH by the sign. Inversely, it is possible to detect the phase relation by judging a sign (polarity) of the α term Vα at a zero-cross point of the stator voltage Vgu.

The output of the multiplier 202 indicates the phase difference. However, if this phase difference is outputted as it is, the phase of the stator voltage of the generator Gen will rapidly change. Then, an integrator 201 with limitation is provided for the phase difference detection value DTH to output a phase difference compensation value LTH.

In the integrator 201 with a limiter, the input is limited by a limiter LMT, and the integrator 201 integrates the output of the limiter LMT, which prevents a rapid phase change in the stator voltage. Further, the value of the integration upon success in synchronizing is stored to be used as an initial value at the following startup operations.

The phase synchronism judging unit CMPTH outputs a flag FLG_TH of "1" when the detected phase difference DTH is within a predetermined range around zero level and the flag FLG_TH of "1" in other conditions. The output of the phase synchronism judging unit CMPTH is supplied to a timing device DLY, which supplies the synchronizing signal SYN to the system controller SYS in FIG. 3 when flag FLG_TH of "1" is continuously outputted for a predetermined interval. Thus, the timing device DLY outputs the synchronizing flag SYN when the flag FLG_TH of "1" is successively outputted for the predetermined interval. In response to the synchronizing signal SYN, the system controller SYS outputs signals Sg0 and Sg1 to operate the switch SW and the electromagnet contact CTT1.

Figure 3:
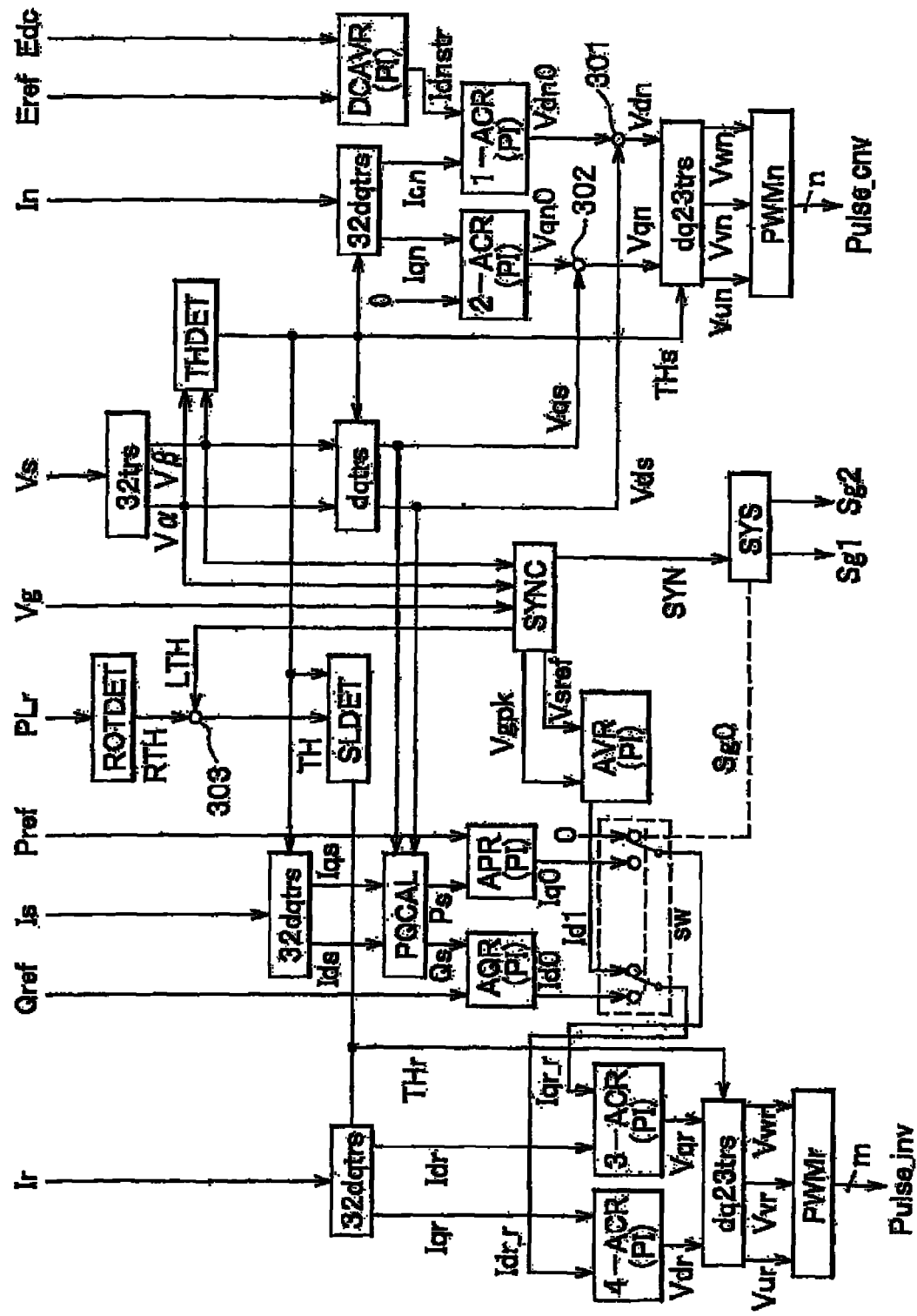
FIG. 3 is a block diagram illustrating the synchronizing control unit according to the first embodiment.

FIG. 5 shows waveforms in a startup operation according to the structure shown in FIGS. 2 and 3. At a startup timing (t=0), the magnet contactor CTT1 is open, and only the converter CNV for cooperative operation operates. Then, equalizing the stator voltage to the grid voltage in amplitude is effected prior to the phase synchronizing operation. When the amplitude of the stator voltage substantially agrees with that of the grid voltage, the phase of the stator voltage is changed to make the difference in phase small by controlling the slip frequency to control the inverter INV.

When the phase of the stator voltage substantially agrees with that of the grid voltage, the system controller SYS supplies the switching signal Sg0 to the switch SW and a close command to the magnet contactor CTT1.

More specifically, in FIG. 5, first the frequency of the stator voltage is equalized to that of the grid voltage by calculating the slip frequency, second the amplitude of the stator voltage is equalized, and finally, the phase of the stator voltage is synchronized with the grid voltage by controlling the converter INV.

Second Embodiment

Figure 6:
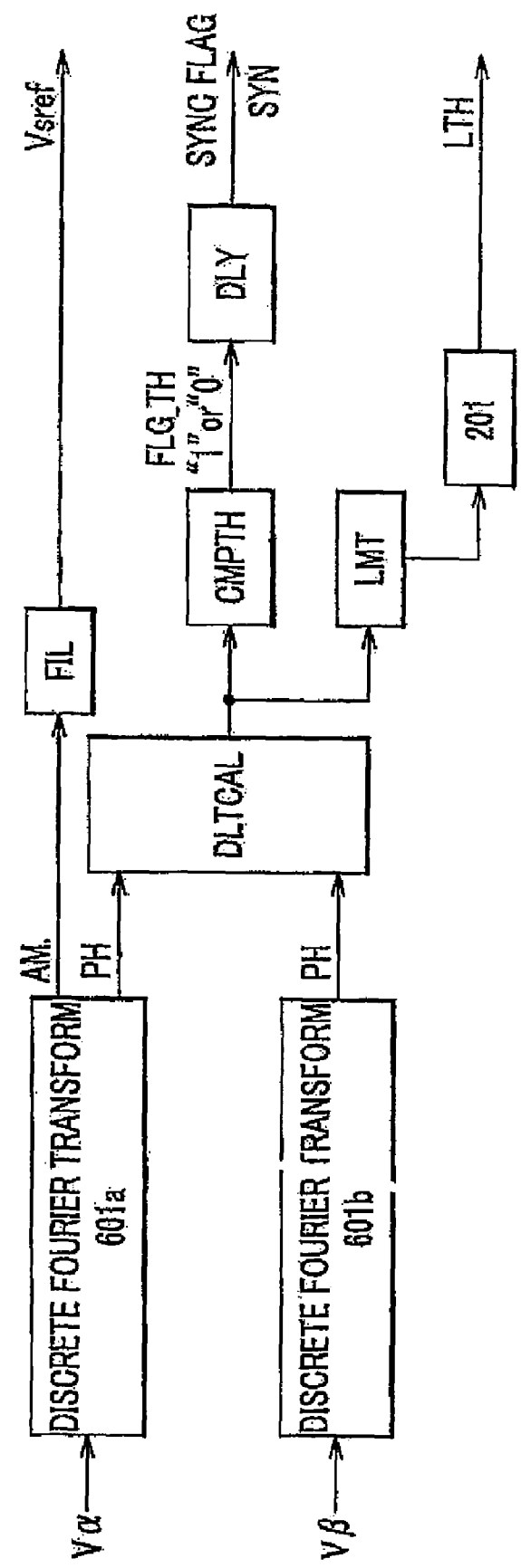
FIG. 6 is a block diagram illustrating a synchronizing control unit according to a second embodiment of the present invention.

A wind turbine generator system according to a second embodiment has substantially the same structure as that of the first embodiment except the part of the synchronizing controller SYNC as shown in FIG. 6. More specifically, amplitudes and phases are detected with discrete Fourier transformers 601a and 601b, which receive the α term Vα of the grid voltage (50/60 Hz) and the stator voltage Vgu to calculate fundamental components to be compared. In this structure, only fundamental components are used for judgment for synchronizing and amplitude equalization, wherein the voltage amplitudes and phases are independently detected. As a result, the phase control can be provided in parallel to the amplitude equalization substantially at the same time.

As described above, the stator voltage Vgu is equalized in amplitude to and synchronized with the grid voltage, using one phase of grid voltage. Thus, the use of only one phase of the grid voltage provides equalization in amplitude to and synchronization with the grid voltage in a short interval. Further, the structure as mentioned above can reduce the number of the voltage sensors on the side of the stator and shorten the startup interval because of the active equalizing and synchronizing operation.

In the second embodiment, the limiter is provided for the phase compensation value to prevent a rapidly change in a phase of the stator voltage. Further, the integration value upon success in synchronization is stored and used as an initial value of the next startup operation. Thus, the initial value of the rotor position sensor is automatically compensated as well as a predetermined value is used as the initial value. This further shortens the startup interval. In addition, if the initial phase position may be deviated by maintenance of the rotor position sensor, the initial value is automatically compensated, which makes the maintenance easy. Further, the synchronizing operation can be completed within one second from start of exciting the secondary winding.

As mentioned above, according to the present invention, the doubly fed generators or motors can be easily linked with the grid, this system according to the present invention is applicable to linkage for, in addition to the wind turbine generator system, various generators using power sources (hydro-electric power stations, flywheel generators, engine generators or the like).

What is claimed is:

1. A wind turbine generator system including a doubly fed generator including a stator and a rotor, comprising:
   a switch arranged on a side of the stator for linkage with a grid;
   a converter for exciting a secondary winding of the doubly fed generator, the rotor being coupled to a wind turbine for generating electric power;
   a controller configured to control the converter;
   first detecting means for detecting a stator voltage at the switch on a side of the stator;
   second detecting means for detecting a grid voltage at the switch on a side of the grid;
   third detecting means for detecting a rotation phase of the doubly fed generator; wherein the controller controls excitation of the secondary winding to control an amplitude and a phase of the stator voltage; and
   controlling means for closing the switch when the phase of the stator voltage is identical with the phase of the grid voltage and the stator voltage is identical with the grid voltage in amplitude,
   wherein the controller generates a torque current command after the controlling means closes the switch).

2. A wind turbine generator system including a doubly fed generator including a stator and a rotor, comprising:
   a switch arranged on a side of the stator for linkage with a grid;
   a converter for exciting a secondary winding of the doubly fed generator, the rotor being coupled to a wind turbine for generating electric power;
   a controller configured to control the converter;
   first detecting means for detecting a stator voltage at the switch on a side of the stator;
   second detecting means for detecting a grid voltage at the switch on a side of the grid;
   third detecting means for detecting a rotation phase of the doubly fed generator; wherein the controller controls excitation of the secondary winding to control an amplitude and a phase of the stator voltage; and
   controlling means for closing the switch when the phase of the stator voltage is identical with the phase of the grid voltage and the stator voltage is identical with the grid voltage in amplitude,
   wherein the controller generates the torque current command for effective power control and reactive power control after the controlling means closes the switch.

* * * * *